United States Patent Office 2,795,481
Patented June 11, 1957

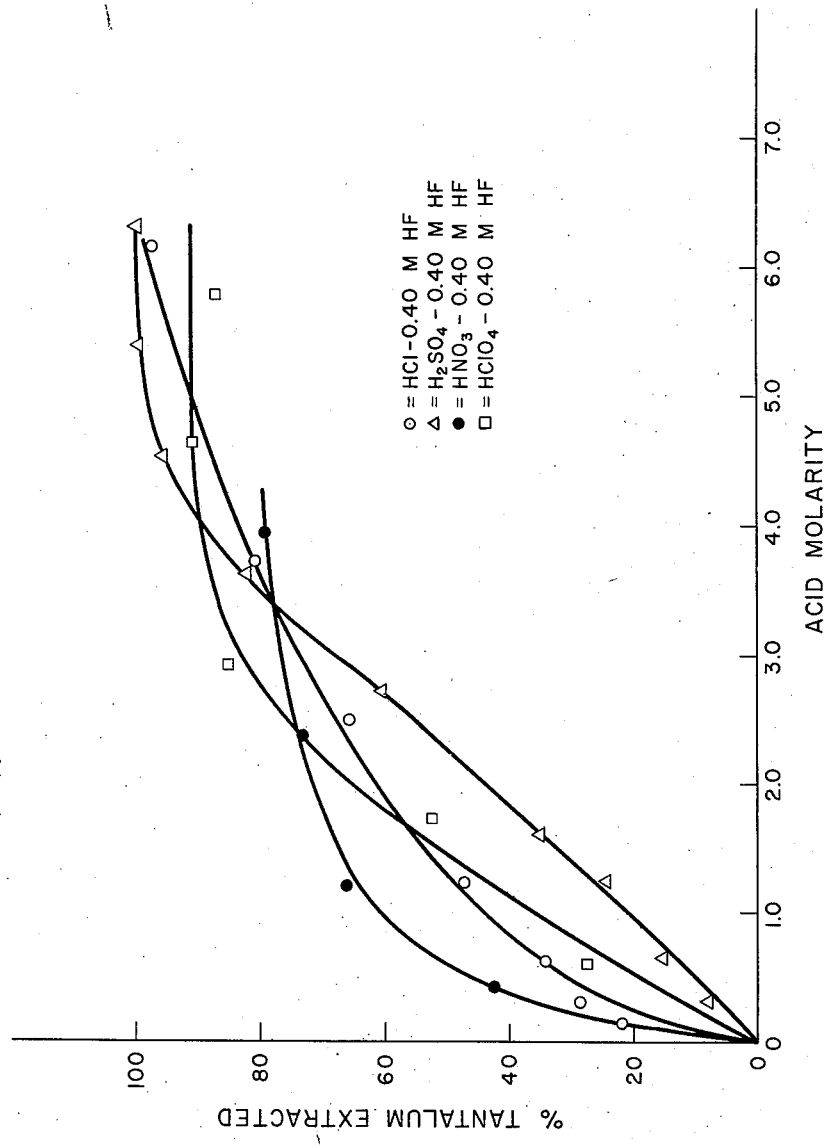

2,795,481

SOLVENT EXTRACTION PROCESS FOR THE SEPARATION OF TANTALUM AND NIOBIUM VALUES

Harry G. Hicks, Danville, Walter E. Nervik, Piedmont, and Peter C. Stevenson, Livermore, Calif., assignors to the United States of America as represented by the United States Atomic Energy Commission Application November 13, 1953, Serial No. 392,072

6 Claims. (Cl. 23—19)

This invention relates, in general, to a process of separation of certain elements, and, more particularly, to a process wherein tantalum and/or certain other elements are preferentially extracted into diisopropyl ketone from mineral acid-hydrofluoric acid-aqueous systems containing niobium and/or various other elements.

In the past the separation of niobium from certain other elements, such as tantalum, has been accomplished by a relatively tedious series of fractional crystallizations or by adsorption on a suitable ion exchange medium with subsequent elution. These methods, especially that of fractional crystallization, tend to be time consuming and comparatively inefficient.

Now it has been discovered that certain metallic factors, including niobium, may be separated from mixtures thereof with certain other metallic factors, including tantalum, by means of preferential solution in a solvent system composed essentially of a mixture of diisopropyl ketone and a mineral acid mixture comprising hydrofluoric acid and an acid selected from the group consisting of sulfuric acid, hydrochloric acid, nitric acid, and perchloric acid.

In general, the process of the present invention is applicable to the separation of a number of elements in the group including tantalum, iron, gallium, antimony, arsenic, selenium, and tellurium from other elements in the group including niobium, silicon, titanium, manganese, zirconium, tin, hafnium, and selenium. The process comprises essentially extracting, with diisopropyl ketone, an aqueous hydrofluoric acid-mineral acid solution of a mixture of one or more elements from the first group, supra, with one or more elements from the second group. The elements in the first group extract into the ketone; the elements in the second group remain in the water.

Accordingly, it is an object of this invention to provide a novel and improved solvent extraction process for the separation of mixtures of certain elements.

Another object of the invention is to provide a solvent extraction process for the separation of tantalum from niobium.

Another object of the invention is to provide a solvent extraction process whereby niobium may be separated from tantalum more rapidly, directly, and with a high yield and purity.

A further object of the invention is to provide a process wherein tantalum may be extracted into an organic solvent from a mixture thereof with niobium in an aqueous-hydrofluoric acid-mineral acid solution.

A further object of the invention is to provide for the separation from niobium of any of the elements selected from the group consisting of tantalum, iron, gallium, antimony, arsenic, selenium, and tellurium.

A still further object of the invention is to provide for the separation from tantalum of any of the elements selected from the group consisting of niobium, silicon, tin, titanium, manganese, zirconium, hafnium, and selenium.

Still another object of the invention is to provide for the separation of any of the elements selected from the group consisting of tantalum, iron, gallium, antimony, arsenic, selenium, and tellurium from any of the elements selected from the group consisting of niobium, silicon, titanium, manganese, zirconium, tin, hafnium, and selenium.

Other objects of the invention will become apparent from a consideration of the following description taken in conjunction with the single figure of the accompanying drawing which is a graphical representation of the extractability of tantalum into diisopropyl ketone in admixture with a system containing a standard concentration of hydrofluoric acid and a variable concentration of various mineral acids.

In accordance with the present invention, there is first produced an aqueous solution of the various elements in a mixture of hydrofluoric acid and a mineral acid chosen from the group comprising sulfuric acid, nitric acid, hydrochloric acid and perchloric acid. This aqueous-acid solution is subsequently contacted with diisopropyl ketone which extracts from the solution the various ketone-soluble components, other components remaining in the aqueous solution. If the mineral acid extracts appreciably into diisopropyl ketone, the ketone is pre-equilibrated with the same concentration of mineral acid used in the extraction. Hydrochloric and sulfuric acids do not extract appreciably; nitric, hydrofluoric and perchloric acids do extract. The elements which are soluble in the organic phase under the various acid conditions are shown in Table I below, as are the elements which remain in the aqueous phase. Moreover, the oxidation state of the element which provides the disclosed results under stated conditions will, hereinafter, be indicated by a parenthesized Roman numeral immediately following the respective element. Therefore such enumeration will indicate the existence in the solutions of an ionic species of said element in the corresponding oxidation state. The value of 0.4 M for the concentration of HF indicated in the following represents a satisfactory working level with the various mineral acids and concentrations shown; however, concentrations of as little as about 0.2 M HF also may be utilized especially if the mineral acid concentration is high. Ordinarily it is not necessary to employ HF in a concentration much greater than about 0.4 M as the extraction efficiency levels off above this concentration.

TABLE I

I. Diisopropyl ketone—.4 M Hydrofluoric—6 M hydrochloric acid system

| Elements remaining in aqueous phase | Elements extracting into organic phase |
|---|---|
| Niobium (V) | Tantalum (V) |
| Silicon (IV) | Iron (III) |
| Tin (IV) | Gallium (III) |
| Titanium (IV) | Antimony (V) |
| Manganese (II) | Arsenic (III) |
| Zirconium (IV) | Selenium (VI) |
| Hafnium (IV) | Tellurium (VI) |
| Selenium (IV) | |

II. Diisopropyl ketone—.4 M hydrofluoric—6 M sulfuric acid system

| Elements remaining in aqueous phase | Elements extracting into organic phase |
|---|---|
| Niobium (V) | Tantalum (V) |
| Silicon (IV) | Selenium (VI) |
| Tin (IV) | Tellurium (VI) |
| Titanium (IV) | |
| Manganese (II) | |
| Zirconium (IV) | |
| Hafnium (IV) | |
| Selenium (IV) | |
| Iron (III) | |
| Gallium (III) | |
| Antimony (V) | |
| Arsenic (III) | |

III. Diisopropyl ketone—0.4 M hydrofluoric—4 M nitric acid system

| | |
|---|---|
| Niobium (V) | Tantalum (V) |

IV. Diisopropyl Ketone—0.4 M hydrofluoric—4.5 M perchloric acid system

| | |
|---|---|
| Niobium (V) | Tantalum (V) |

The resultant phases from the above extraction are separated and, if necessary, the aqueous phase is extracted again. The separate organic extraction aliquots are combined for subsequent treatment; tantalum (V), iron (III), gallium (III), antimony (V), arsenic (III), selenium (VI), and tellurium (IV) may be back-extracted from the diisopropyl ketone into water. The niobium in the aqueous phase may be recovered by treating the aqueous solution with boric acid to complex any fluorides present and adding ammonium hydroxide to precipitate the hydrated oxide. The oxide is washed with 4 M nitric acid, then 4 M hydrochloric acid, leaving the pure niobium oxide. The aqueous filtrate from the niobium oxide precipitate and the washing liquid from the acid wash of this precipitate may be combined, and other elements may be recovered therefrom, by devious standard methods well known in the art. The organic phase is contacted twice with water to back-extract tantalum (V), iron (III), gallium (III), antimony (V), arsenic (III), selenium (VI), and tellurium (IV) into the aqueous phase. Tantalum may be recovered by adding boric acid to the combined washings from the above extraction to complex the fluorides, and precipitating the metal as the hydrated oxide by adding ammonium hydroxide to the resultant aqueous solution. This precipitated oxide is washed with 4 M nitric acid, then 4 M hydrochloric acid, leaving the pure tantalum oxide. The aqueous filtrate from the tantalum oxide precipitate and the washing liquid from the acid wash of the precipitate may be combined, and other elements may be recovered therefrom by devious standard methods well known in the art. Those elements not back-extracting into water may be separated from the remaining organic phase by evaporation of the diisopropyl ketone.

The relative efficiencies of the various aqueous systems of diisopropyl ketone, hydrofluoric acid, and another mineral acid in the separation of tantalum (V) from niobium (V) may be better illustrated by reference to Table II below:

TABLE II

| Acid Concentrations | Element | Percent Extracted | Extraction Coefficient | Ratio of Extraction Coefficients, Ta/Nb |
|---|---|---|---|---|
| HCl—3.70 M and | Ta | 81 | 4.3 | 91 |
| HF—0.40 M | Nb | 4.5 | 0.047 | |
| HNO$_3$—3.92 M and | Ta | 79 | 3.8 | 880 |
| HF—0.40 M | Nb | 0.43 | 0.0043 | |
| H$_2$SO$_4$—4.50 M and | Ta | 95 | 19 | 160 |
| HF—0.40 M | Nb | 11 | 0.12 | |
| HClO$_4$—4.61 M and | Ta | 90 | 9.0 | 290 |
| HF—0.40 M | Nb | 3.0 | 0.031 | |

As may be seen from the above table and Table I, the most specific separation and purification of the respective elements, tantalum and niobium, occurs in the diisopropyl ketone-hydrofluoric acid-sulfuric acid system. However, effective separation is achieved by the use of any of the acid combinations shown.

This variation in extraction efficiency of the ketone in various acid mediums may be further illustrated by reference to Fig. 1 which is a graphical representation of the extraction of tantalum from aqueous solutions in the indicated acid systems. As may be seen from this figure, increasing molarities of the various mineral acids in admixture with a constant molarity of hydrofluoric acid produces higher extractabilities of tantalum from the ketone. At an acid molarity value of 6.0, for example, the sulfuric acid-hydrofluoric acid combination affords a higher extraction of the tantalum into the ketone, followed in order of greatest extraction efficiency by that of the hydrochloric acid-hydrofluoric acid system, then the perchloric acid-hydrofluoric acid system, and finally the nitric acid-hydrofluoric acid system (extrapolated).

Further details of the processes of the invention will be apparent from the following example:

*Example*

A mixture of 10 milligrams each of the oxides of tantalum and niobium were dissolved in 5 milliliters of a solution adjusted to 3 M in hydrochloric acid and 0.4 M in hydrofluoric acid and the solution was extracted for one minute with 5 milliliters of diisopropyl ketone. The phases were separated and the organic phase was washed with a solution of 3 M hydrochloric acid and 0.4 M hydrofluoric acid, discarding the washing solution. The aqueous phase was extracted with diisopropyl ketone and this extraction was discarded.

Boric acid was added to the aqueous phase to complex any fluoride present, then ammonium hydroxide was added to precipitate the hydrated oxides, which were washed with a dilute ammonium nitrate solution. The organic phase was contacted twice with water and, after adding boric acid to the combined washings to complex any fluoride present, the hydrated metal oxides were precipitated with ammonium hydroxide and washed with a dilute ammonium nitrate solution. Spectrographic analysis of the precipitates showed a composition for the precipitate from the aqueous layer of 98 percent niobium and 2 percent tantalum and a composition for the precipitate from the organic layer of 99.5% tantalum and 0.5% niobium.

While there has been herein described what may be considered to be preferred embodiments of the invention, it will be understood that various modifications may be made therein and it is intended to cover all such modifications as may fall within the scope of the appended claims.

What is claimed is:

1. A method for separating niobium and tantalum values comprising producing a solution of said values in a mixture of hydrofluoric acid and a mineral acid selected from the group consisting of sulfuric, nitric, hydrochloric and perchloric wherein said values exist in a pentavalent oxidation state; contacting the solution with diisopropyl ketone; separating the ketone phase from the aqueous phase; recovering the niobium from the aqueous phase by treating such phase with boric acid and ammonium hydroxide to precipitate niobium oxide therefrom, separating the niobium oxide from the aqueous phase, washing the oxide with 4.0 M nitric acid and then with 4.0 M hydrochloric acid; and recovering the tantalum from the ketone phase by back-extracting the tantalum into water from the diisopropyl ketone, treating the aqueous extract with boric acid and ammonium hydroxide to precipitate tantalum oxide therefrom separating the tantalum oxide from the extract, washing the oxide with 4.0 M nitric acid, and then with 4.0 M hydrochloric acid.

2. A method for separating niobium and tantalum values comprising producing a solution of said values in a mixture of hydrofluoric acid and a mineral acid selected from the group consisting of sulfuric, nitric, hydrochloric and perchloric wherein said values exist in a pentavalent oxidation state; contacting the resultant solution with diisopropyl ketone; separating the ketone phase from the aqueous phase; recovering the niobium from the aqueous phase by treating such phase with boric acid and ammonium hydroxide to precipitate niobium oxide therefrom, separating the oxide from the aqueous phase, and washing the oxide with 4.0 M nitric acid and then washing the oxide with 4.0 M hydrochloric acid; and recovering the tantalum from the ketone phase by back-extracting the tantalum into water from the diisopropyl ketone, treating the aqueous extract with boric acid and ammonium hydroxide to precipitate tantalum oxide therefrom, separating the tantalum oxide from the extract, washing the oxide with 4.0 M nitric acid, and then washing the oxide with 4.0 M hydrochloric acid.

3. The process as defined in claim 2 but wherein said HF has a concentration in the range of about 0.2 to 0.4 M and said mineral acid is hydrochloric of above about 3.0 M concentration.

4. The process as defined in claim 2 but wherein said HF has a concentration in the range of about 0.2 to 0.4 M and said mineral acid is sulfuric of above about 3.0 M concentration.

5. The process as defined in claim 2 but wherein said HF has a concentration in the range of about 0.2 to 4.0 M and said mineral acid is nitric of above about 1.0 M concentration.

6. The process as defined in claim 2 but wherein said HF has a concentration in the range of about 0.2 to 0.4 M and said mineral acid is perchloric of above about 2.0 M concentration.

References Cited in the file of this patent

UNITED STATES PATENTS

| | | |
|---|---|---|
| 1,314,571 | Chase | Sept. 2, 1919 |
| 2,566,665 | Huffman et al. | Sept. 4, 1951 |
| 2,615,798 | Pitzer | Oct. 28, 1952 |
| 2,767,047 | Wilhelm et al. | Oct. 16, 1956 |

FOREIGN PATENTS

| | | |
|---|---|---|
| 476,558 | Great Britain | Dec. 6, 1937 |

OTHER REFERENCES

Kraus et al.: Chemical Abstracts, vol. 44, October–November 1950, 9843g.

Leddicotte et al.: Journal of the American Chemical Society, vol. 74, page 1618, March 20, 1952.

Burstall et al.: Chemical Society Journal, 1952, Part 2, pages 1497–1504.

Craig: Analytical Chemistry, January 1951, vol. 23, pages 41–44.

Milner et al.: "The Analysis of Uranium-Tantalum and Uranium Niobium Alloys," A. E. R. E., c/R895, April 1952.

Wood: "The Determination of Total Tantalum and Niobium in Minerals and Ores by Solvents Extraction in the Presence of Activated Cellulose," CRL/AE, 62.

United States Atomic Energy Commission, Technical Information Div., Ore, Oak Ridge, Tenn.